US007856132B2

(12) United States Patent
Nijlunsing et al.

(10) Patent No.: US 7,856,132 B2
(45) Date of Patent: Dec. 21, 2010

(54) METHOD, A COMPUTER PROGRAM, AN APPARATUS AND AN IMAGING SYSTEM FOR IMAGE PROCESSING

(75) Inventors: Rutger Nijlunsing, Eindhoven (NL); Jean-Pierre Franciscus Alexander Maria Ermes, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1058 days.

(21) Appl. No.: 11/569,598

(22) PCT Filed: May 25, 2005

(86) PCT No.: PCT/IB2005/051675

§ 371 (c)(1),
(2), (4) Date: Nov. 27, 2006

(87) PCT Pub. No.: WO2005/116937

PCT Pub. Date: Dec. 8, 2005

(65) Prior Publication Data

US 2007/0269091 A1 Nov. 22, 2007

(30) Foreign Application Priority Data

May 28, 2004 (EP) .................................. 04102394

(51) Int. Cl.
*G06K 9/00* (2006.01)
*G06K 9/32* (2006.01)
*G06K 9/36* (2006.01)
(52) U.S. Cl. ..................... 382/131; 382/291; 382/293
(58) Field of Classification Search .............. 382/128, 382/130, 131, 132, 291, 293
See application file for complete search history.

(56) References Cited

U.S. PATENT DOCUMENTS

| 6,256,595 | B1 | 7/2001 | Schwalb |
| 6,574,357 | B2 | 6/2003 | Wang |
| 2002/0006231 | A1 | 1/2002 | Jayant |
| 2002/0051561 | A1* | 5/2002 | Inagaki ...................... 382/106 |

FOREIGN PATENT DOCUMENTS

| EP | 1349098 A | 10/2003 |
| JP | 06142100 | 5/1994 |
| WO | 0063844 A1 | 10/2000 |
| WO | WO/0063844 | * 10/2000 |

OTHER PUBLICATIONS

Trobina, "Error Model of a Coded-Light Range Sensor," Sep. 1995, available at http://citeseerx.ist.psu.edu/viewdoc/summary?doi=10.1.1.34.6434.*
Cavallo A. et al "A Hybrid approach to the 3D High Precision Position Measurement and Particle Tracking in Human Cell Nuclei", Real-Time Imaging, vol. 8, No. 6, Dec. 2002.
Rohr K. et al "Landmark Error Ellipsoids for Image registration based on Approximating Thin-Plate Splines" CAR'97, Berlin 1997.
* cited by examiner

*Primary Examiner*—John B Strege (57) ABSTRACT

A method for processing an image comprising the steps of assigning a value of a positioning error to a detail in the image, wherein the value corresponds to a positioning uncertainty of a position of the detail in the image. The method includes visualizing the value of the positioning error enabling an interactive adjustment of the value. The method further includes storing the adjusted value of the positioning error with reference to a position of the detail in the image.

20 Claims, 6 Drawing Sheets

METHOD, A COMPUTER PROGRAM, AN APPARATUS AND AN IMAGING SYSTEM FOR IMAGE PROCESSING

The invention relates to a method for processing an image, comprising the step of:
assigning a value of a positioning error to a detail in the image;
visualizing said value of the positioning error.

The invention further relates to a computer program.

The invention still further relates to an apparatus arranged for image processing, said apparatus comprising:
computing means arranged to assign a value of a positioning error to a detail in an image;
visualization means arranged to visualize the value of the positioning error.

The invention still further relates to an imaging system.

An embodiment of a method as is set forth in the opening paragraph known from K. Rohr et al 'Incorporation of Landmark Error Ellipsoids for Image Registration Based on Approximating Thin-plate Splines', Proc. Computer Assisted Radiology and Surgery (CAR'97), Berlin, Germany, June 25-28, 1997. The known method is arranged to enable an elastic registration of three-dimensional tomographic images, said registration being based on a set of corresponding anatomical landmarks taking into account anisotropic landmark localization errors in form of three-dimensional error ellipsoids. For example, a two-dimensional slice of a human brain comprising suitable details may be produced based on a volumetric data acquired using magnetic resonance apparatus. The known method is further arranged to assign respective values of positioning errors to suitable details in the image. This feature of the known method is based on a per se known method of non-rigid matching of medical images using approximating thin-plate splines. In order to assign the value of the positioning error to the details within the image, the known method is arranged to estimate three-dimensional covariance matrices at landmarks directly from the image data. The corresponding error ellipsoids are visualized in the image and are arranged to characterize the local intensity variations at a detail under consideration, thus yielding corresponding values for respective positioning errors of the details.

It is a disadvantage of the known method that the estimated accuracy of the positioning of the details is used for purposes of image registration only and is not considered during further steps of image processing.

It is an object of the invention to provide a method for image processing whereby a determination of an accuracy of a further image processing step is enabled.

To this end the method according to the invention comprises the further steps of:
enabling an interactive adjustment of said value;
storing the value of the positioning error with reference to a position of the detail in the image.

According to the technical measure of the invention, the user is enabled to adjust the value of the positioning error assigned to the detail under consideration in an interactive way, thus bringing in his expertise, if required. he initial assignment of the value may be carried out manually or automatically. The (adjusted) value is stored with reference to the position of the detail and is used during further steps of image processing. According to the technical measure of the invention the reliability of the further image processing steps is improved. In general, it is possible that the value of the positionining error equals a default value assigned to an imaging modality. In this case all details within the image are assigned this default value, which is stored with reference to every position of every detail in the image. The user may then alter this default value, which in this case will be overwritten by a value given by the user.

The technical measure of the invention is based on the insight that in particular measurements and computations carried out based on raw image data, notably of medical origin completely ignore respective accuracies of positioning of the details within the image. In must be noted that the term 'detail' hereby refers to a pixel or a voxel indicative, for example of a structure of an object being imaged, suitable example comprising a structure within a human anatomy. Alternatively and/or additionally, the term 'detail' may refer to a further object within the image, for example a medical instrument, or the like. In order to determine the accuracy of a further step of the image processing, knowledge of the accuracy of the positioning of the details within the image is required. In general, the accuracy is a distribution of probabilities, for example a normal distribution around a point. Alternatively, the accuracy may be anisotropic, for example rotation-dependent. Distributions that can be parameterized can be interacted with in a simple way. For example, the normal distribution is normally parameterized with a sigma, which can be visualized with a circle in case of a 2D point being a detail under consideration. The radius of this circle equals the sigma. In the case of a 3D point, a sphere might be used to indicate the sigma. Other examples include a 2D point with independent x and y component: the visualization might be a rectangle, where the width of the rectangle represents the sigma of the x component and the height of the rectangle represents the sigma of the y component. Visualization of a distribution is not limited to graphical objects: text and/or numbers on the output device are perfectly capable in describing a distribution, for example the text '3.05±0.45 mm' might indicate a uniform distribution from 2.60 mm up to and including 3.50 mm. In order to adjust the value of the positioning error of the detail the user may use suitable graphic means in case the visualization is graphic. Otherwise, the user may turn to suitable input means to enter the value of the positioning error of the detail under consideration.

In an embodiment of the method according to the invention, the method further comprises the steps of:
interactively assigning a further value of a positioning error to a further detail;
storing the further value with reference to a position of the further detail.

This technical measure is particularly advantageous for situations, where the value of the positioning error is not assigned to each relevant detail identifiable in the image. Thus, the user may introduce the value of the positioning error to a new selected detail, whereby the absolute value of the positioning error may be copied from a neighbor detail, or it may be based on an expertise of the user. According to the technical measure of the invention the user is not only enabled to define respective values of the positioning errors of relevant further details within the image, but also to use these values during further steps of image processing, because the corresponding values of the positioning errors are stored with reference to the respective positions of the further details under consideration.

In a further embodiment of the method according to the invention, the method further comprises the steps of:
establishing a parameter indicative of an image quality;
assigning the value of the positioning error automatically based on the parameter.

It is found to be advantageous to compute the initial value of the positioning error of the detail in an automated way. For example, suitable per se known algorithms for image processing, for example edge detection algorithm, may automatically assign a suitable parameter distinguishing between blurry edges in the image and sharp edges in the image, this parameter being used to automatically compute corresponding values of the positioning errors. The user may still edit the computed value, still improving the reliability of the image analysis.

In a still further embodiment of the method according to the invention, for positioning of the details said image is overlaid with a graphic template of the detail, said graphic template being defined within an image processing tool.

This technical measure is particularly advantageous in case the image comprising the details is subject to a complicated further processing. Such further processing may include, for example a delineation of details of interest. Such delineation may comprise a delineation of structures within the image, for example delineation of suitable anatomical sites. Alternatively, said delineation may comprise a delineation of further objects identifiable in the image, like, for example surgical instruments, catheters or the like.

According to the present embodiment of the method of the invention, the details to be delineated are automatically overlaid with suitable graphic templates, whereby geometric matching between the templates and the details is carried out using suitable per se known image matching techniques. Because the geometric template is defined within a suitable image processing tool, the value of the positioning error assigned to the detail is automatically taken into account during the step of delineation of an area based on a plurality of pixels or voxels each having its respective position within the image and the value of the positioning error within the image. Thus, the delineated area or volume is characterized by its positioning error using suitable error propagation algorithm. Thus, the reliability of the further image processing step is improved.

Alternatively, for an image processing step including a measurement with respect to a detail identified within the image, suitable landmarks linked to the details can be used as input for a more complex measurement. Complex measurements are measurements which are built on top of other measurements. For example, an angle between two lines might be build up of a line, and a line, and the angle-between-lines. A line might be build up by landmarks for start and end. Combining complex measurements with landmarks-with-inaccuracy yields a complex measurement which takes the accuracy into account. For example, two landmarks can determine a line by its start and by its end. If the landmark have an ellipse as location error distribution and we are interested in the angle of the line, the resulting line would be a line with added with an inaccuracy of the angle. Two of those lines with an uncertain angle have an angle between them, this new angle measurement has a new inaccuracy determined by the inaccuracy of the two lines combined. In this case initial errors in the positioning of the details are taken into account and their propagation into a measurement result is taken into account accordingly.

In a still further embodiment of the method according to the invention the graphic template is defined within a geometric relational application framework macro.

This technical measure is advantageous, as the graphic relational application macro can be configured to interrelate a plurality of objects in such a way, that when a single object is repositioned, the other objects related to it are repositioned accordingly. This results not only in a provision of a fully automated image processing, but also in a provision of a highly reliable delineation, measurement and image processing, whereby the accuracy of the positioning of relevant details within the image is taken into account.

An embodiment of the image handling using the geometric relational application framework macro is known from WO/0063844, which is assigned to the present Applicant. The geometric application framework macro is arranged to provide detailed descriptions of various geometric templates defined within the image, in particular to structurally interrelate said templates within geometry of the image, thus providing a structural handling of various geometrical templates so that a certain pre-defined geometrical consistency between the templates is maintained. The geometric application framework macro further enables analysis and/or measurement of geometrical properties of anatomical structures, when the structure is provided with a suitable landmark. A broad variety of possible geometric relations between pre-definable geometric templates, like a circle, a line, a sphere, etc., is possible and is defined within the geometric application framework macro. The geometric template is operable by the geometric application framework macro using a landmark, or a set of landmarks associated with the geometric template.

The computer program according to the invention is arranged to cause the processor to carry out the steps of the method as are set forth in the foregoing.

The apparatus according to the invention further comprises interactive means arranged to enable an adjustment of said value by a user, the computing means being further arranged to store the value of the positioning error with reference to the position of the detail.

By provision of the interactive means the user is enabled to edit and/or to append the relevant details identified within the image with a suitable accuracy of the positioning of the detail, whereby this accuracy is further taken into consideration during further steps of image processing. Preferably, the accuracy is visualized using suitable graphic means, for example by drawing a geometric figure corresponding to the positioning uncertainty and/or, alternatively by linking an interactive text-box feeding back the value of the positioning error to the user. Further advantageous embodiments of the apparatus according to the invention are set forth with reference to claims 9-13.

An imaging system according to the invention comprises a display means and the apparatus, as is set forth in the foregoing. Advantageously, the imaging system according to the invention further comprises a data acquisition unit connectable to the image processing apparatus. In this way an easy to operate data acquisition and processing system is provided, whereby the user is enabled to carry out necessary image processing steps with high reliability.

These and other aspects of the invention are explained in further details with reference to figures.

Figure 1:
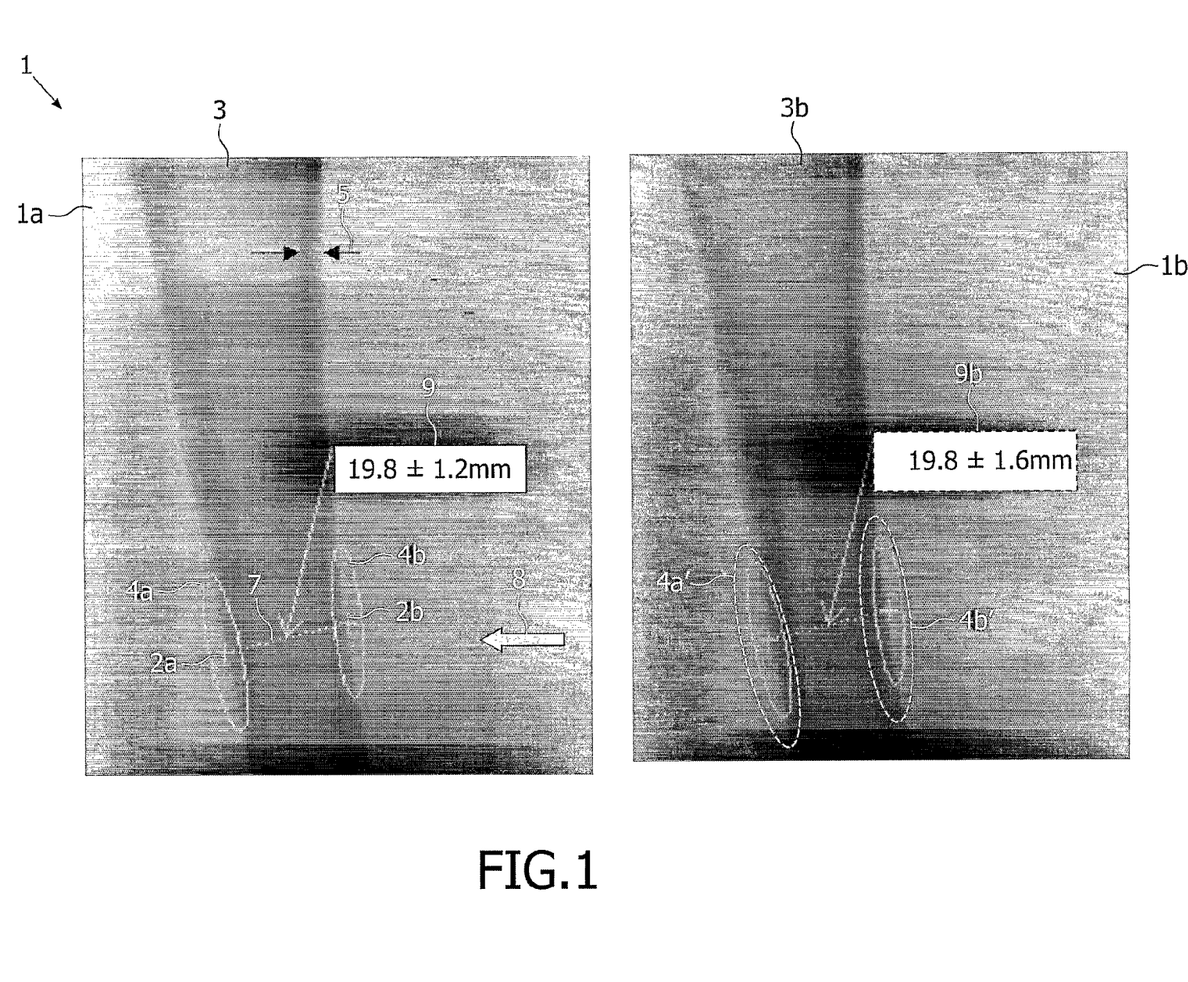
FIG. 1 presents in a schematic way an embodiment of a method according to the invention whereby a measurement with reference to image details provided with an identification of the positioning error is carried out.

The invention relates to a method for processing an image comprising the steps of: assigning a value of a positioning error to a detail in the image; visualizing said value of the positioning error; enabling an interactive adjustment of said value; storing the value of the positioning error with reference to the position of the detail. At step 1a of the method the image 1 two details 2a and 2b are identified. The details are positioned so that to coincide with an exterior of a femoral bone 3, whereby each detail is assigned a value of a positioning error, which is visualized to the user, for example by means of suitable ellipses 4a and 4b. The respective values of the positioning error may be introduced manually by the user using suitable input means. Alternatively, it is possible that the value of the positioning error is assigned to the detail based on a parameter indicative of the image quality. Still alternatively, it is possible that every pixel within the image is assigned an initial default value of the positioning error, which corresponds, for example to an imaging modality the image 1 has been acquired from. The user is provided with means to adjust the value of the positioning error interactively. For this purpose, for example the user may use the cursor 8 to drag the respective boundaries of the ellipses, thus changing the corresponding value of the positioning error. The value of the positioning error is stored together with the coordinate of the detail within the image. Thus, in case a measurement relative to any of the details linked to the positioning error is carried out, the result of the measurement is provided with an uncertainty value derived from the values of the positioning error. This is schematically illustrated in window 9, arranged to feed back a result of a measurement of a distance between image details 2a and 2b. The user may adjust the assigned value of the positioning error, by redefining the areas 4a', 4b' of the positioning errors for the details 2a and 2b, enlarging them. The corresponding reading of the measurement uncertainty, shown in window 9b, is changed accordingly.

FIG. 1 presents in a schematic way an embodiment of a method according to the invention whereby a measurement with reference to image details provided with an identification of the positioning error is carried out. However in this example the image 1 comprises a diagnostic medical image, other images are contemplated as well. The method according to the invention will be explained using two consecutive steps 1a and 1b. At step 1a the image 1 comprises an area of a human anatomy wherein two details 2a and 2b are identified. The details are positioned to coincide with an exterior of a femoral bone 3. The details 2a, 2b may be positioned manually or in an automatic way using, for example edge detection algorithm. Due to the fact that the image of the femoral bone 3 comprises an edge 5, there is an uncertainty in the positioning of the details 2a, 2b irrespective of the method these details are seeded in the image. According to the method of the invention each detail is assigned a value of a positioning error, which is visualized to the user, for example by means of suitable ellipses 4a and 4b. The respective values of the positioning error may be introduced manually by the user using suitable input means. Alternatively, it is possible that the value of the positioning error is assigned to the detail based on a parameter indicative of the image quality. For example, an edge detection algorithm may be suitably arranged to evaluate the gradient along the edge of the femoral bone, the value of the positioning error being deduced from the gradient. Still alternatively, it is possible that every pixel within the image is assigned an initial default value of the positioning error, which corresponds, for example to an imaging modality the image 1 has been acquired from. According to the method of the invention, the user is provided with means to adjust the value of the positioning error interactively. For this purpose, for example the user may use the cursor 8 to drag the respective boundaries of the ellipses, thus changing the corresponding value of the positioning error. Otherwise, the user may use a suitable input means, like a keyboard to enter the absolute value of the positioning error directly. The value of the positioning error is stored together with the coordinate of the detail within the image. Thus, in case a measurement relative to any of the details linked to the positioning error is carried out, the result of the measurement is provided with an uncertainty value derived from the values of the positioning error. This is schematically illustrated in window 9, arranged to feed back a result of a measurement of a distance between image details 2a and 2b.

According to the method of the invention, the user may adjust the assigned value of the positioning error, in case his expertise dictates so. This is schematically illustrated at step 1b. Here the user has redefined the areas of the positioning errors for the details 2a and 2b, enlarging them to 4a', 4b'. The corresponding reading of the measurement uncertainty, shown in window 9b, is changed accordingly.

The method according to the invention is advantageous as it provides means to include positioning uncertainties into an error propagation calculation. This is of particular relevance in case an area or a volume of interest is to be delineated, for example for purposes of preparing a radiotherapy treatment plan. Using the example shown in FIG. 1 let us assume that an volume corresponding to a part of the femur bone is to be irradiated. In this case the user may delineate the volume of interest manually, or it may be delineated automatically based on pixel or voxel values. In both cases according to the method of the invention the resulting volume will be appended with the information on the delineation error calculated based on the positioning errors of the details constituting the volume of interest. Preferably, the delineated volume of interest is enlarged by a margin covering for the greatest deviation, thus ensuring that the radiotherapy planning is carried out accurately covering for possible image processing uncertainties.

Figure 2:
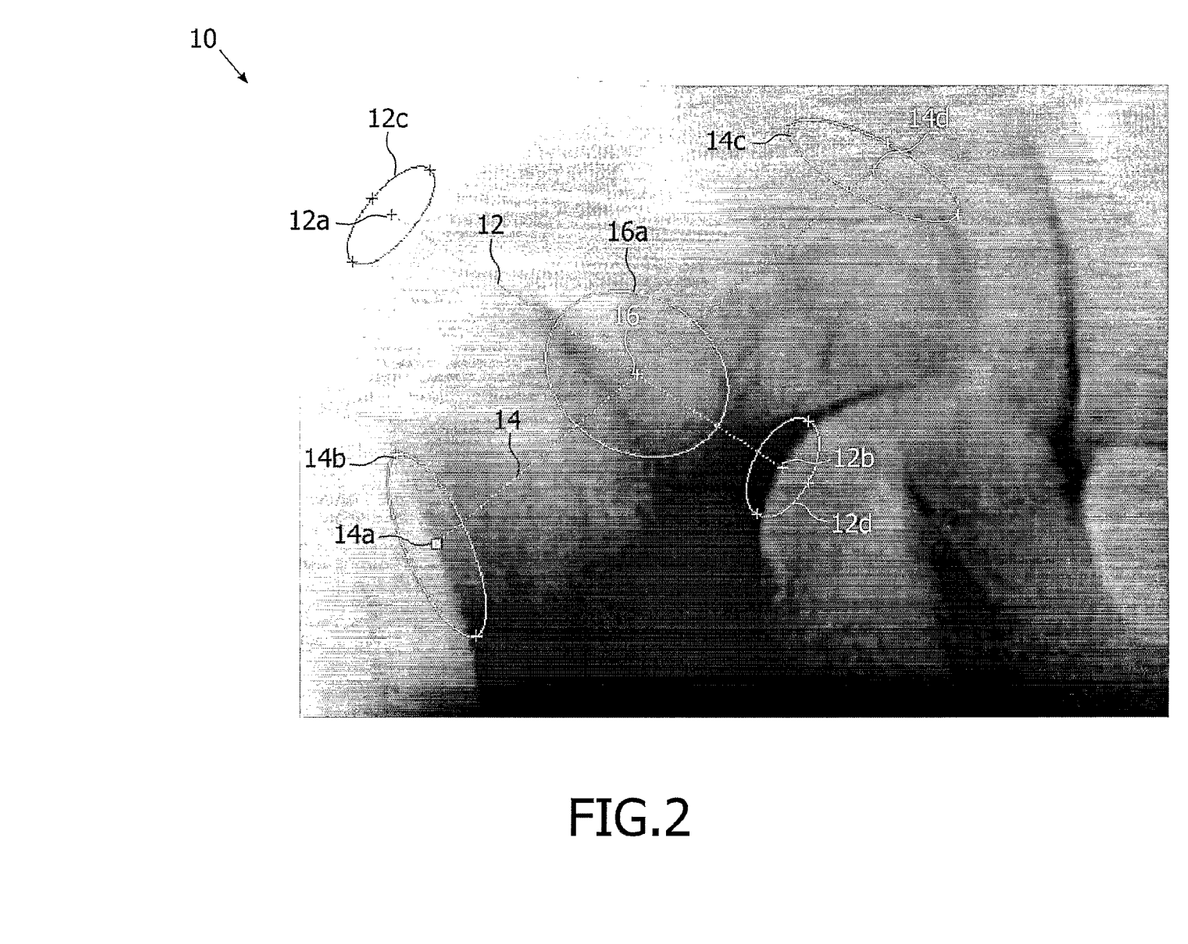
FIG. 2 presents in a schematic way a further embodiment of a method according to the invention whereby an image handling with reference to image details provided with an identification of the positioning error is carried out.

FIG. 2 presents in a schematic way a further embodiment of a method according to the invention whereby an image handling with reference to image details provided with an identification of the positioning error is carried out. The image 10 comprises a diagnostic X-ray image showing a part of a human bone. This image may be used for planning a surgery, notably an orthopedic intervention. For this purpose it might be useful to determine a point of intersection between a first centerline 12 of a femur head with a second centerline 14 of the femur head. It is possible, that the image 10 is provided with automatically delineated details 12a and 12b, defining the first centerline 12. The details 12a, 12b are provided with respective visualized positioning errors 12b, 12c. The user may define the second centerline 14, by identifying further details 14a, 14b and by identifying corresponding positioning errors 14b, 14c, respectively. The intersection of the lines 12, 14 is illustrated by a point 16, which is provided with a positioning error indication 16a, given by a suitable ellipsoid. The value and the shape of the positioning error indicator 16a is dependent on the absolute values of the four respective positioning errors of the details and the distribution thereof. Usually, for the same image the distribution will be the same, like a uniform distribution, or a normal distribution. For the same type of distributions the indicator 16a will usually have the same shape as the indicators of the positioning errors of the details. Alternatively, it is possible that different parts of the image 10 are assigned (automatically or manually) different distributions, which is allowable for situations where different parts of the image have different degrees of freedom. In this case the indicator 16a may have an irregular shape, it being determined by a convolution of different distributions.

Figure 3:
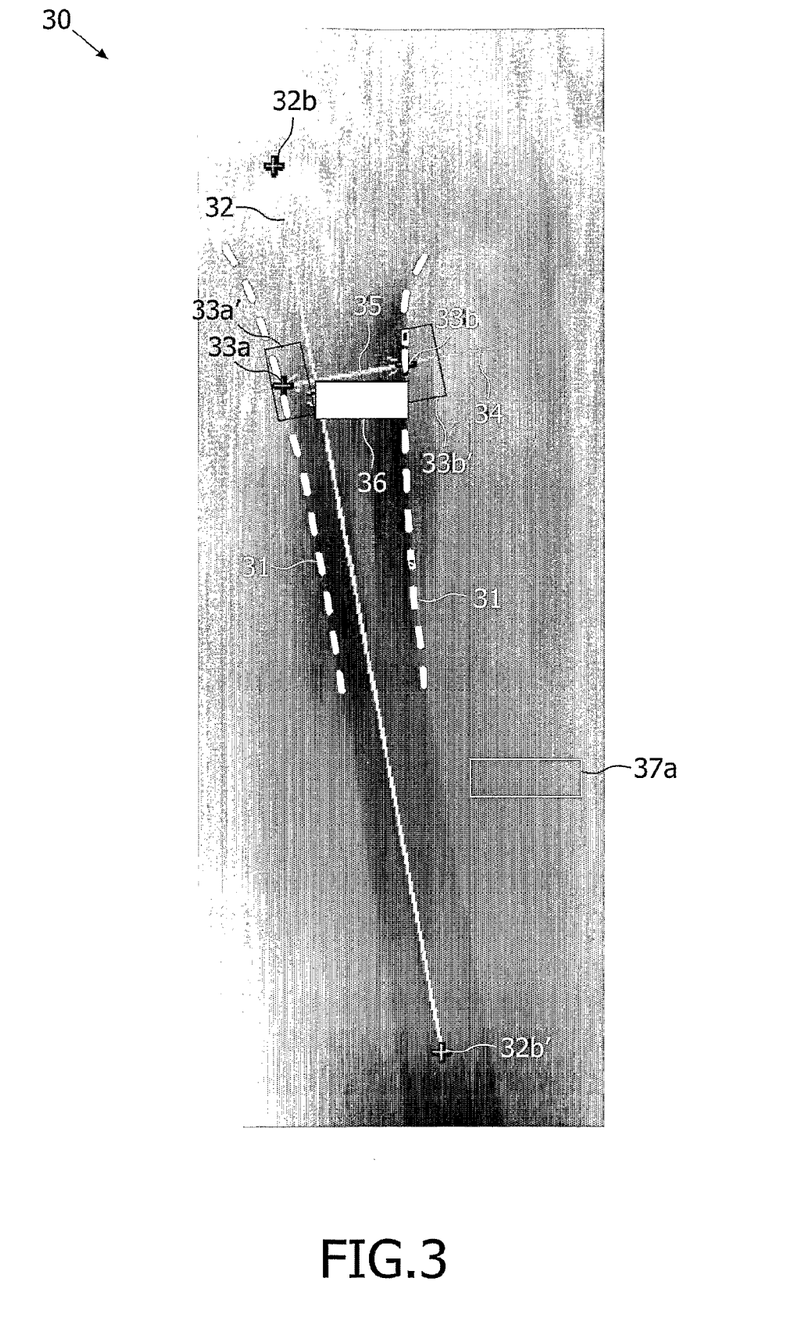
FIG. 3 presents in a schematic way an embodiment of a method according to the invention whereby a detail is overlaid by a graphic template.

FIG. 3 presents in a schematic way an embodiment of a method according to the invention whereby a detail is overlaid by a graphic template. Although in this example the graphic template comprises a measurement tool arranged within a geometric relational application framework macro, other suitable graphic templates are possible. In this example an automatic diameter measurement of a human femur is shown. The solid lines 32, 34 represent graphic templates within the geometric relational application framework macro: a line 32 modeling the femoral axis, a second perpendicular line 34 modeling a direction of a diameter measurement 35. The structure of the geometric relational application framework macro is known per se from WO/0063844. The perpendicular line 34 is arranged to contain two graphic templates, namely two point objects 33a, 33b with an associated distance measurement, all being defined within the geometric relational application framework macro. In this example, open contours 31 are associated with the points 33a, 33b. These contours position themselves automatically along the edges of the femoral bone using a suitable image segmentation technique. Through specifically defined relations between the line 34, the line 32 and the contours 31, the positions of the two point objects 33a, 33b are automatically adapted to the intersection of the perpendicular line 34 and each graphic object 31. This embodiment is arranged to determine the distance between the points 33a, 33b. The points 33a, 33b are provided with corresponding positioning error indicators 33a', 33b'. These values may be input by the user using an interactive text editor in a window 37a. This example shows rectangles visualizing the positioning errors, as hereby it is judged that the positioning error in first direction does not equal a positioning error in a second direction. The corresponding value of the distance and the uncertainty therein is shown in the window 36. In case the position of the points 33a, 33b and/or the absolute value of the positioning errors is changed, the reading in window 36 is updated automatically due to an advantageous combination of functionality of the geometric relational application framework macro and the method of the invention. Also, the reading of the distance 36 is automatically updated in case when a position of any of the lines 31, 32, 34 is changed, leading to a different reading of a length for a trajectory 35 between new points 33a and 33b. Thus, in case when the user picks up the perpendicular line 34 and moves it along the femoral axis, the diameter measurement 35 will adapt dependent on the current femur diameter at a new location of the perpendicular line 34. According to this technical measure, a versatile and easy to operate image processing means is provided, whereby due to coupling between the graphic objects in a geometric relational application framework macro, any repositioning of the objects automatically lead to an update of the measurement of the object of interest 35, appended with a corresponding accuracy value.

Figure 4:
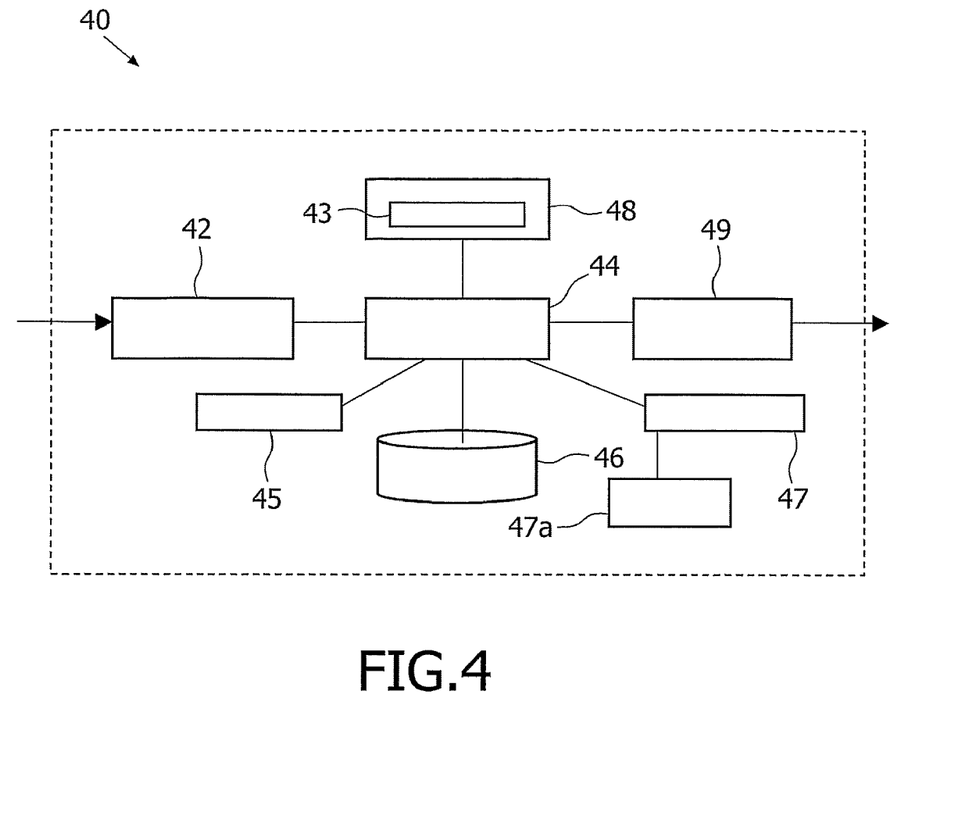
FIG. 4 presents in a schematic way an embodiment of an apparatus according to the invention.

FIG. 4 presents in a schematic way an embodiment of an apparatus according to the invention. The image processing apparatus 40 has an input 42 for receiving the image data in any suitable form. For example, the apparatus 40 may be involved in the acquisition of the image data. In this case the image data may be acquired in an analogue form and converted using a suitable A/D converter to a digital form for further processing. The image data may also be received in a digital form, e.g. through direct acquisition in a digital form or via a computer network after having been acquired by another computer/medical instrument. The core of the image processing apparatus is formed by a processor 44 which is arranged to load image data from the input means 42 and made these data available for further processing. An example of a suitable processor 44 is a conventional microprocessor or signal processor, a background storage 48 (typically based on a hard disk) and working memory 46 (typically based on RAM). The background storage 48 can be used for storing the image data (or parts of it) when not being processed, and for storing operations of the graphic template and suitable shape models (when not being executed by the processor). The main memory 46 typically holds the (parts of) image data being processed and the instructions of the geometric template and the models used for processing those parts of the image data. The apparatus 40 according to the invention comprises computing means 45 arranged to assign a value of the positioning error to a detail in the image. The computing means may be arranged to assign said value automatically, for example based on a default value applicable to the image as a whole, or to calculate a parameter wherefrom the value of the positioning error is deduced. The apparatus further comprises visualization means 47 arranged to visualize the value of the positioning error. For example, the visualization means 47 may be arranged to provide a textual feed-back of respective positioning errors continuously, or on demand, when a user selects a detail. Preferable, the visualization means is arranged to graphically visualize the positioning error in the image by means of suitable geometric shapes. The apparatus 40 further comprises interactive means 47a, arranged to enable an adjustment of the value of the positioning error by a user. Various embodiments of the interactive means 47a are envisaged. For example, a file reader for reading a default value from a file provided by the user, a graphic user interface enabling the user to draw respective indicators of the positioning errors, a text editor, an interactive window, or the like. Preferably, computing means 45, visualization 47 and the interactive means 47a are operable by a computer program 43, preferably stored in memory 48. An output 49 is used for outputting the result of a suitable data processing, like a measurement result, a delineation of an area or a volume of interest, or the like. For example, if the processor 44 has been loaded with a segmenting program, for example retrieved from the storage 48, then the output may be a segmented structure with the volume of interest provided with a positioning margin, calculated based on the positioning errors of the details constituting the volume of interest.

Figure 5:
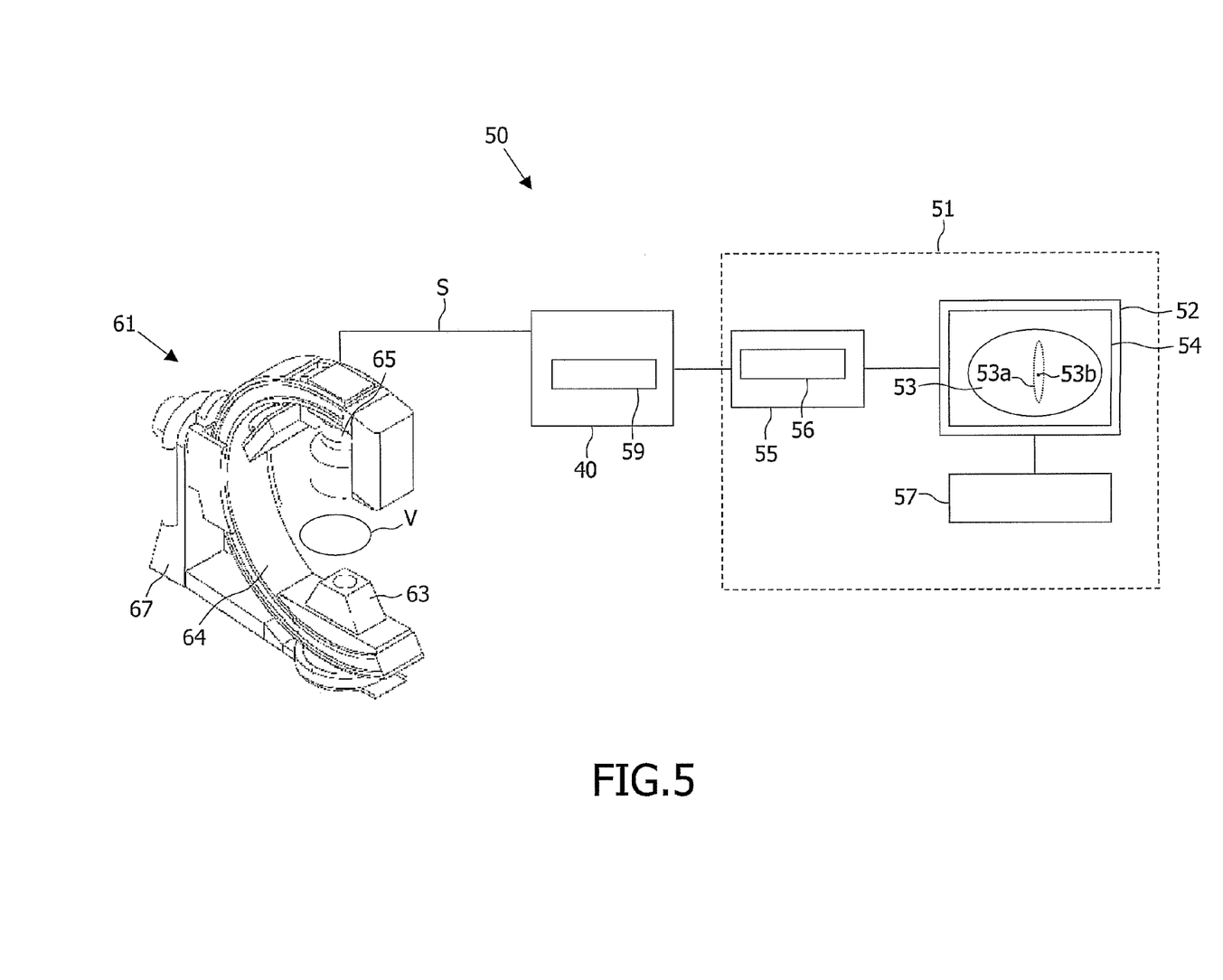
FIG. 5 presents in a schematic way an embodiment of an imaging system according to the invention.

FIG. 5 presents in a schematic way an embodiment of an imaging system according to the invention. The imaging system 50 according to the invention comprises the apparatus 40 arranged for image processing based on an image data 59. The output of the apparatus 40 preferably comprises an image with at least one detail provided with a value of the positioning error stored with reference to a position of the detail in the image. The output of the apparatus 40 is made available to the further input means 55 of a viewer 51. Preferably, the further input means 55 comprises a suitable further processing means arranged to operate a suitable interface using a program 56 adapted to control the user interface 54 so that an image 53 comprising suitable detail 53b associated with the positioning error thereof 53a is visualized. Preferably, for user's convenience, the viewer 51 is provided with a high-resolution display means 52, the user interface being operable by means of a suitable interactive means 57, for example a mouse, a keyboard or any other suitable user's input device. Preferably, the image analysis system 50 further comprises a data acquisition unit 61. However in this example an X-ray device is shown, other data acquisition modalities, like a CT, magnetic resonance apparatus or an ultra-sound device are contemplated as well. The apparatus 61 is arranged to acquire image data from an object, for example a patient, positioned in an acquisition volume V of the apparatus 61. For this purpose a beam of X-rays (not shown) is emitted from the X-ray source 63. The transmitted radiation (not shown) is registered by a suitable detector 65. In order to enable an oblique imaging, the X-ray source 63 and the X-ray detector 65 are mounted on a gantry 64 which is rotatably connected to a stand 67. A signal S at the output of the X-ray detector 65 is representative of the image data 59.

Figure 6:
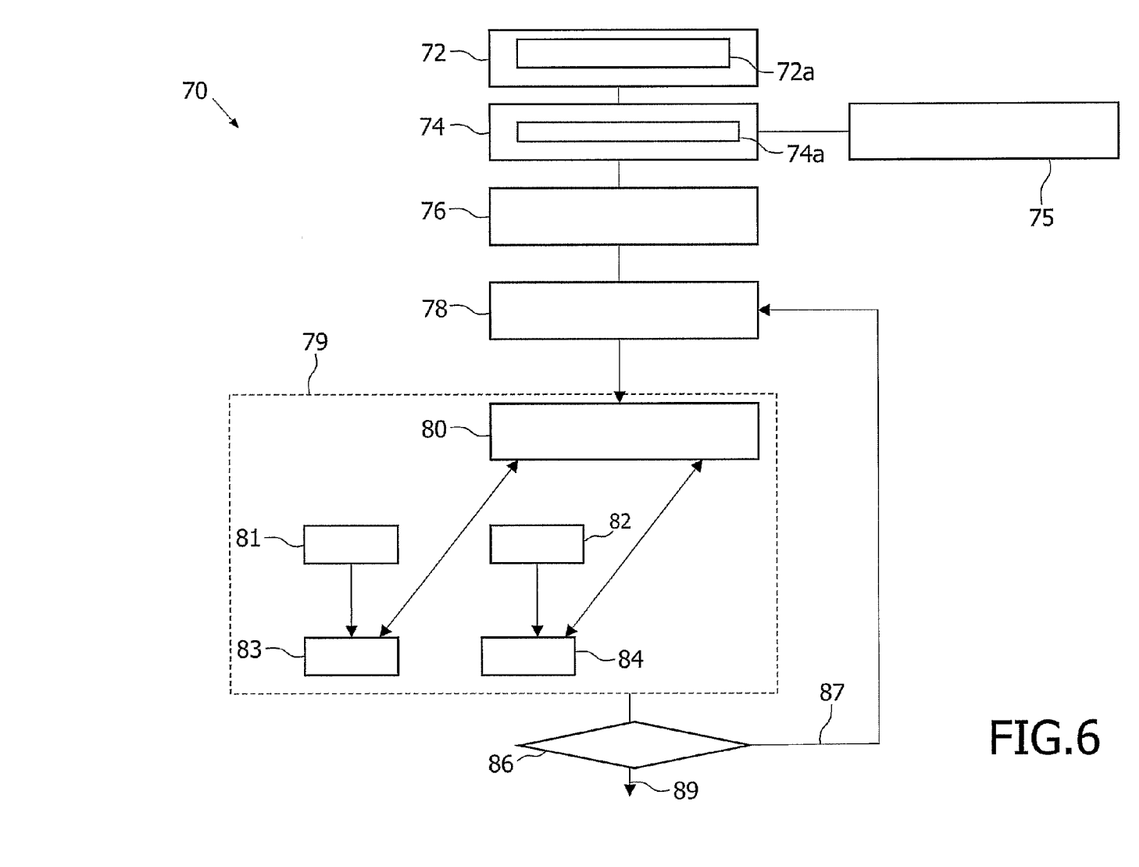
FIG. 6 presents in a schematic way an embodiment of a work-flow of the method according to the invention.

FIG. 6 presents in a schematic way an embodiment of a work-flow of the method according to the invention. At step 74 of the method according to the invention in the image 72a a suitable detail 74a is assigned a value of the positioning error. It is possible that before the step 74 a step 72 is executed, wherein a suitable image data 72a is loaded into a suitable image processing means. Preferably, the value of the positioning error is loaded from a suitable file 75, corresponding, for example to positional inaccuracies of a certain imaging modality. Alternatively, the value of the positioning error 74a may be on-line calculated based on the image data 72a, for example, by assigning a suitable parameter characterizing a quality of the image. This operation can successfully be implemented using per se known image processing technique, for example an edge detection algorithm. At step 76 the value of the positioning error is visualized using suitable textual or graphic means. In case a plurality of details is identified at step 74, the user may select a detail he wishes to base a further step of image processing on. Additionally, at step 78 the user may identify a further detail and assign a further positioning error to this detail. It is also possible to adjust the value of the positioning error to the detail using suitable interactive means. When all necessary details are identified and all necessary positioning errors are assigned and/or adjusted, the user is enabled to perform a further step of image processing based on said details whereby uncertainties in the positioning of the details are taken into account for calculation of error propagations. This operation is schematically illustrated at step 79. Hereby a suitable image processing operation 80 is selected. This operation may, for example include a measurement with reference to the details 83, 83, each provided with a respective value of the positioning error 81, 82. The result of the measurement, for example a length between details 83, 84 is appended by an uncertainty based on the positioning errors 81, 82. The result being feed-back to the user at step 86. In case the user accepts the result, he exits the image processing at step 89, otherwise he may be returned to step 78 to edit the position of the details and/or their respective positioning errors.

The invention claimed is:

1. A method for processing an image comprising the steps of:
   assigning a value of a positioning error to a detail in the image, wherein the value corresponds to a positioning uncertainty of a position of the detail in the image;
   visualizing said value of the positioning error;
   enabling an interactive adjustment of said value;
   storing the adjusted value of the positioning error with reference to a position of the detail in the image.

2. The method according to claim 1, further comprising the steps of:
   interactively assigning a further value of a positioning error to a further detail;
   storing the further value with reference to a position of the further detail.

3. The method according to claim 1, said method further comprising the steps of:
   establishing a parameter indicative of an image quality;
   assigning the value of the positioning error automatically based on the parameter.

4. The method according to claim 1, wherein the detail in the image is overlaid with a graphic template defined within an image processing tool.

5. The method according to claim 4, wherein for the image processing tool a geometric relational application framework macro is selected.

6. The method according to claim 1, further comprising the steps of:
   performing a measurement in the image relative to at least one detail linked to the value of the positioning error thereof;
   computing an accuracy of the measurement based on the value.

7. A computer readable storage medium encoded with instructions which, when executed by a computer, cause a processor of the computer to perform the steps of:
   assigning a value of a positioning error to a detail in the image, wherein the value corresponds to a positioning uncertainty of a position of the detail in the image;
   visualizing said value of the positioning error;
   enabling an interactive adjustment of said value;
   storing the adjusted value of the positioning error with reference to a position of the detail in the image.

8. An apparatus arranged for image processing, said apparatus comprising:
   computing means arranged to assign a value of a positioning error to a detail in an image, wherein the value corresponds to a positioning uncertainty of a position of the detail in the image;
   visualization means arranged to visualize the value of the positioning error,
   wherein the apparatus further comprises interactive means arranged to enable an adjustment of said value by a user, the computing means being further arranged to store the adjusted value of the positioning error with reference to the position of the detail.

9. An apparatus according to claim 8, wherein the interactive means is further arranged to enable an assignment of a further value of a positioning error to a further detail, the computing means being further arranged to store the further value with reference to the position of the further detail.

10. An apparatus according to claim 8, further arranged to establish a parameter indicative of an image quality, the computing means being further arranged to assign the value of the positioning error automatically based on the parameter.

11. An apparatus according to claim 8, wherein the apparatus is further arranged to overlay said image with a graphic template of at least one detail, said graphic template being defined within an image processing tool.

12. An apparatus according to claim 11, wherein the image processing tool is defined within a geometric relational application framework macro.

13. An apparatus according to claim 8, wherein the apparatus is further arranged to enable a measurement with reference to at least one detail, the computing means being arranged to compute an accuracy of the measurement based on the value of the positioning error assigned to the detail.

14. An imaging system comprising the apparatus according to claim 8 and a display means.

15. An imaging system according to claim 14, further comprising a data acquisition system linked to the image processing apparatus.

16. The method of claim 1, wherein assigning the value of the positioning error to the detail in the image includes overlaying a volume of interest on the image that surrounds the detail in the image.

17. The method of claim 16, wherein the volume of interest identifies a portion of an anatomical structure of a patient in the image for a medical procedure.

18. The method of claim 16, wherein a user interactively adjusts a size of the volume of interest so that the volume of interest encloses a predetermined margin around a greatest position deviation of the detail in the image.

19. The method of claim 1, wherein the value is based on a gradient along an edge of a structure in the image.

20. The method of claim 1, wherein the image is a diagnostic image and the detail corresponds to a region of a patient in the diagnostic image.

\* \* \* \* \*